United States Patent
Reichl et al.

(10) Patent No.: US 6,568,284 B1
(45) Date of Patent: May 27, 2003

(54) MEASURING DEVICE FOR THE CONTACTLESS MEASUREMENT OF AN ANGLE OF ROTATION

(75) Inventors: Asta Reichl, Stuttgart (DE); Thomas Klotzbuecher, Rudersberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/856,107

(22) PCT Filed: Sep. 22, 1999

(86) PCT No.: PCT/DE99/03025

§ 371 (c)(1),
(2), (4) Date: May 17, 2001

(87) PCT Pub. No.: WO00/29814

PCT Pub. Date: May 25, 2000

(30) Foreign Application Priority Data

Nov. 17, 1998 (DE) .......................... 198 52 916

(51) Int. Cl.[7] .............................. G01L 3/02; G01B 7/14; G01B 7/30

(52) U.S. Cl. .............................. 73/862.333; 324/207.2; 324/207.25

(58) Field of Search ..................... 73/862.332, 862.333; 324/209, 207.2, 207.25; 336/120

(56) References Cited

U.S. PATENT DOCUMENTS

| 979,503 | A | * | 12/1910 | Johnson ..................... 336/120 |
|---|---|---|---|---|
| 2,467,738 | A | * | 4/1949 | Godsey ..................... 12/142 D |
| 3,329,012 | A | * | 7/1967 | Demuth ..................... 336/30 |
| 4,437,061 | A | * | 3/1984 | Shinozaki et al. ..... 310/156.37 |
| 4,891,567 | A | * | 1/1990 | Fujitani et al. ........... 310/68 R |
| 5,444,369 | A | * | 8/1995 | Luetzow ..................... 123/376 |
| 5,861,745 | A | * | 1/1999 | Herden ..................... 324/207.2 |

FOREIGN PATENT DOCUMENTS

| DE | 196 34 281 A1 | 2/1998 |
|---|---|---|
| EP | 0 611 951 A | 8/1994 |
| WO | 99 30113 A | 6/1999 |

* cited by examiner

Primary Examiner—Hezron Williams
Assistant Examiner—Lilybett Martir
(74) Attorney, Agent, or Firm—Michael J. Striker

(57) ABSTRACT

A measuring instrument for contactless detection of an angle of rotation is comprised of a supporting plate (14) made of soft magnetic material, which serves as a rotor. Two segments (16, 17, 16a) that are separated by a slot (21), a spacing gap (22), and a third gap (60) are disposed in a plane in relation to the supporting plate (14). The spacing gap (22) in this case is embodied in the segment (17) in the form of a recess. The gap (60), however, is disposed in the segment (16a), likewise in the form of a recess. The ratio of the size of the spacing gap (22) to the gap (60) can be modulated so that an offset shift of the characteristic curve is produced.

14 Claims, 7 Drawing Sheets

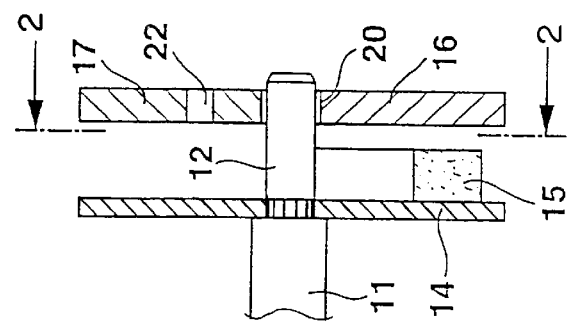
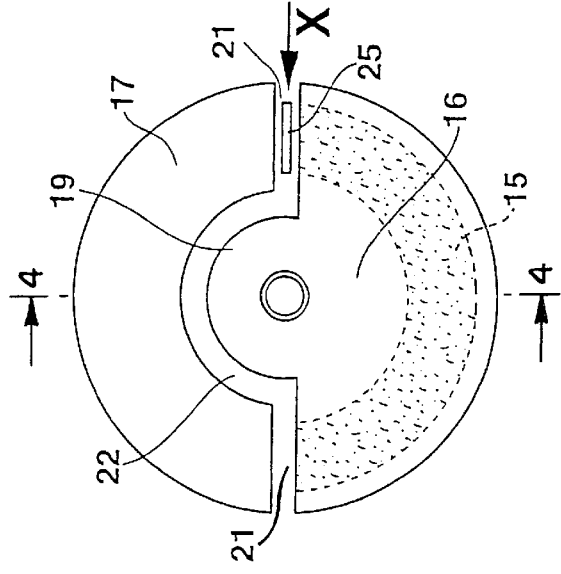
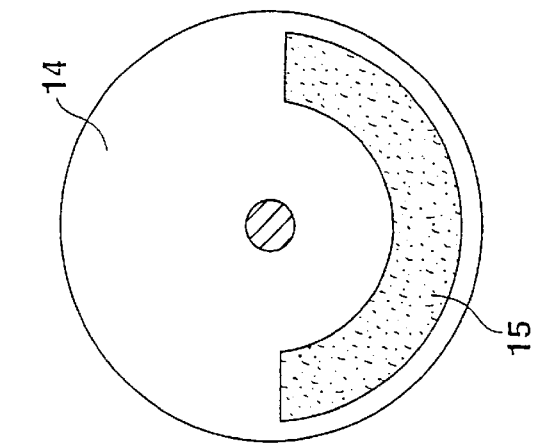
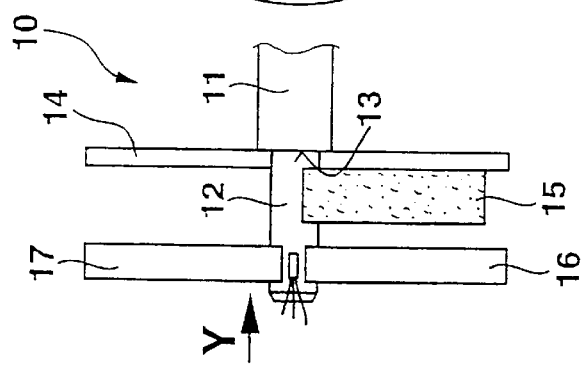

MEASURING DEVICE FOR THE CONTACTLESS MEASUREMENT OF AN ANGLE OF ROTATION

PRIOR ART

The invention is based on a measuring instrument for contactless detection of an angle of rotation. DE-OS 196 34 381.3 has disclosed a sensor which is disposed in three superposed planes. The rotor constitutes the middle plane, wherein it is comprised of the supporting plate for a permanent magnet. The supporting plate itself is comprised of magnetically nonconductive material so that the magnetic flux travels via the two other planes, i.e. the stator, and is dispersed with the aid of two spacers which are disposed between the two planes of the stator. The shaft or the projection of a shaft that is attached to the rotor has no influence on the magnetic flux. With this sensor, a relatively large angular range can in fact be measured without a change of sign, but it is relatively large in terms of the axial direction due to being constructed of three parallel planes.

ADVANTAGES OF THE INVENTION

The measuring instrument for contactless detection of an angle of rotation according to the invention has the advantage over the prior art that the sensor has a relatively small size in the axial direction. It is comprised of only two planes. The supporting plates of the permanent magnet which represents the rotor is simultaneously also used to convey the magnetic flux. Furthermore, the shaft or axle supporting the rotor is included in the conduction of the magnetic flux, as a result of which additional magnetic flux conducting pars are rendered unnecessary. Furthermore, this design reduces the number of parts and the assembly costs involved with them.

Due to its simple design, the sensor can, for a relatively low assembly cost, be integrated into various systems, e.g. a throttle measuring device, a pedal module for a gas pedal travel sensor or can be used as an independent sensor in throttle valve transmitters or a body spring compression device.

Advantageous modifications and improvements of the measuring instrument disclosed in claim 1 are possible by means of the steps taken in the dependent claims.

DRAWINGS

Exemplary embodiments of the invention are shown in the drawings and will be explained in detail the following description.

FIGS. 1 to 4 show different views of or sections through a first exemplary embodiment.

FIG. 1 is a longitudinal section in the direction X according to FIG. 3,

FIG. 2 shows a section B—B according to FIG. 4,

FIG. 3 shows a top view in the direction Y according to FIG. 1,

FIG. 4 is a longitudinal section in the direction A—A according to FIG. 3.

FIGS. 21 to 27 show the embodiment and the magnetic flux of this exemplary embodiment when the gaps are of equal width.

DESCRIPTION OF THE EXEMPLARY EMBODIMENT

Figure 3A:
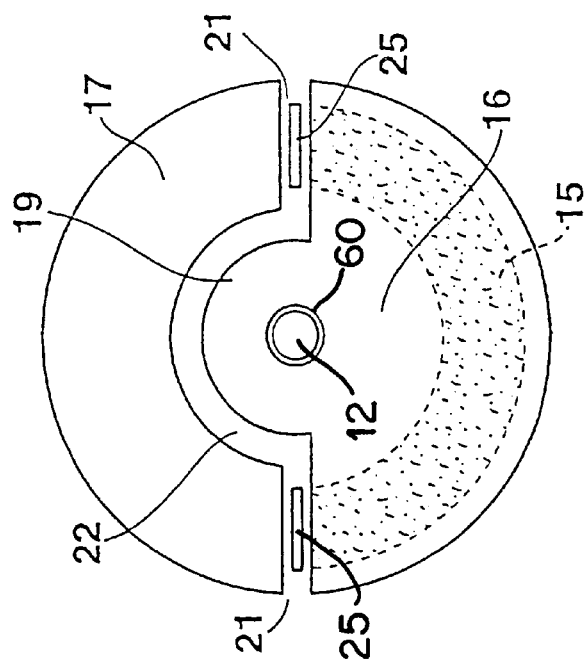
FIGS. 3a and 3b show two further exemplary embodiments.

In FIGS. 1 to 4, a sensor is labeled 10, which with the aid of an axle 11, is connected to a component, not shown, whose rotational movement is to be determined. A projection 12 is attached to the end face of the axle 11 so that a shoulder 13 is produced on which a supporting plate 14 is centrally placed, which simultaneously serves as a rotor. The axle 11, the projection 12, and the supporting plate 14 can be embodied both as separate components and as a single component. An annular permanent magnet 15 is disposed on the supporting plate 14 with the greatest possible radial distance from the center point, i.e. from the attachment point of the axle 11. The greater this distance, the better the resolution of the measurement signal. The permanent magnet 15 can be embodied as a sector of a circle (circle segment) or part of a circular ring. Its angular range is at least as great as the to-be-determined maximal angle of rotation of the component to be monitored and measured. As can be seen from the depictions in FIGS. 2 and 3, the angular range of the permanent magnet 15 in this exemplary embodiment is 180° so that a 180° angle of rotation to be measured can be achieved. The permanent magnet 15 is furthermore polarized in the axial direction, i.e. perpendicular to the supporting plate 14. The supporting plate 14 is comprised of magnetically conductive, in particular soft magnetic material. According to the invention, the axle 11 and the projection 12 or at least the projection 12 is comprised of magnetically conductive, in particular soft magnetic material.

Figure 3B:
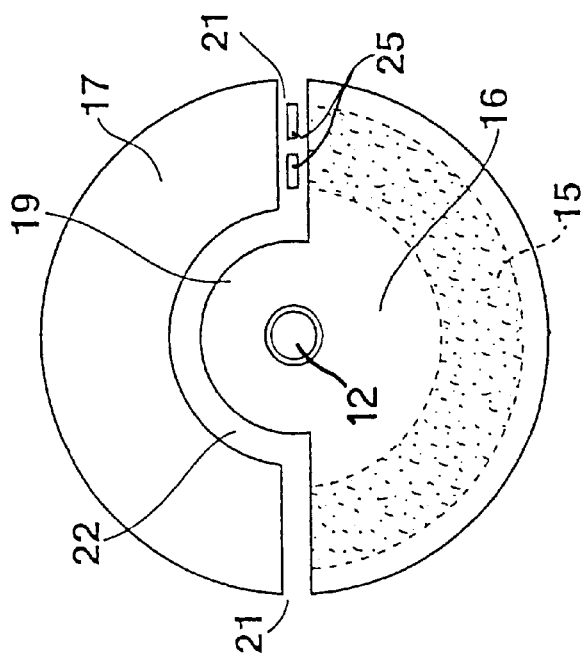

In a second plane above the permanent magnet 15, a stator, which is comprised of two segments 16, 17, is disposed parallel to and spaced slightly apart from the supporting plate 14. In so doing, the segment 16 encompasses the projection 12 with an arc 19. In this exemplary embodiment, the arc 19 is embodied as an arc of a circle. However, a different contour is also conceivable. The essential thing, however, is that a magnetically conductive connection be possible between the projection 12 and the segment 16. The gap 20 between the axle 11 and the arc 19 must therefore be embodied as small as possible. A continuous gap is embodied between the two segments 16, 17 and in the exemplary embodiment according to FIGS. 1 to 4, has two identically embodied outer sections 21 and a central spacing gap 22 disposed in the vicinity of the arc 19. With regard to the spacing gap 22, it is important that as close as possible to no magnetic flux of the magnetic field lines produced by the permanent magnet 15 is possible between the segments 16 and 17, i.e. in the vicinity of the arc 19 in this exemplary embodiment. The spacing gap 22 can therefore be filled with air or with another magnetically nonconductive material. If the spacing gap 22 is filled with air, then it must be embodied as larger in comparison to the gap 21 in order to achieve this above-mentioned effect. Instead of air, a different magnetically nonconductive material can also be selected. A magnetic field-sensitive element 25, such as a Hall-effect digital switch, a magnetic transistor, coils, magnetoresistive element, or a Hall element, is disposed in the gap 21, approximately in the middle. In this connection, it is important that the magnetic field-sensitive component has as linear as possible a dependency of its output signal on the magnetic induction B. In FIGS. 1 to 4, a respective measurement is depicted with the aid of a single magnetic field-sensitive element 25, a Hall element. In this instance, the element 25 must be disposed as close as possible to the middle in the gap 21. However, it would also be possible, for example, to dispose a respective element 25 in each of the two gaps 21 in order, for example, to be able to execute a so-called redundant measurement (safety measurement) as shown in FIG. 3A. It would also be conceivable to dispose two elements in one gap as shown in FIG. 3B. If a magnetic field-sensitive element 25 is disposed in only one gap 21, as shown in FIG. 3, then the opposite gap 21 can also be the size of the spacing gap 22 and can consequently have the magnetically nonconductive function of the spacing gap 22. Naturally, it is also possible to dispose the gap 21 that serves as the measurement gap not only symmetrically, as shown in FIG. 3, but also asymmetrically or at an angle. The important thing is that the gap 21 be embodied as relatively small in relation to the spacing gap 22 in order to permit there to be as little impedance as possible to the flow of the magnetic lines through the magnetic field-sensitive element 25.

Figure 5:
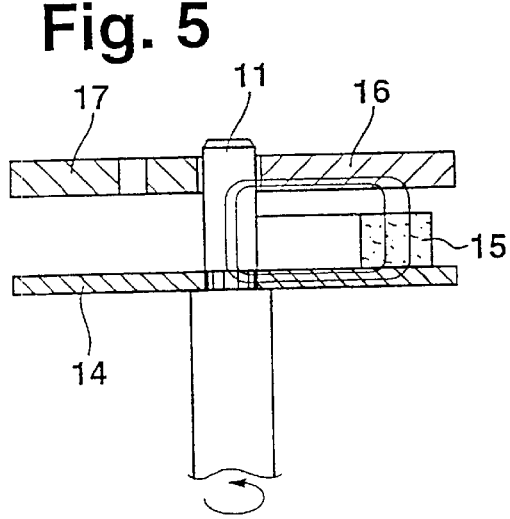
FIGS. 5 and 6 show the magnetic flux with an angular rotation of 0° and an induction of B=0.
Figure 7:
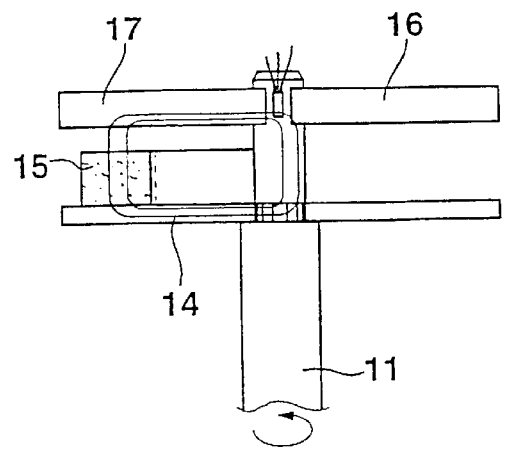
FIGS. 7 and 8 show the corresponding magnetic flux with a maximal angular rotation and an induction of B=max.
Figure 6:
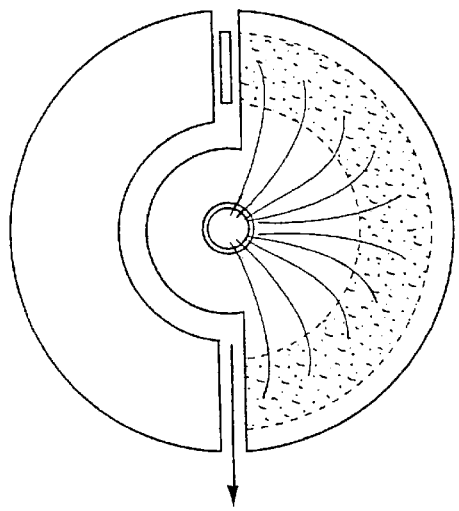
Figure 8:
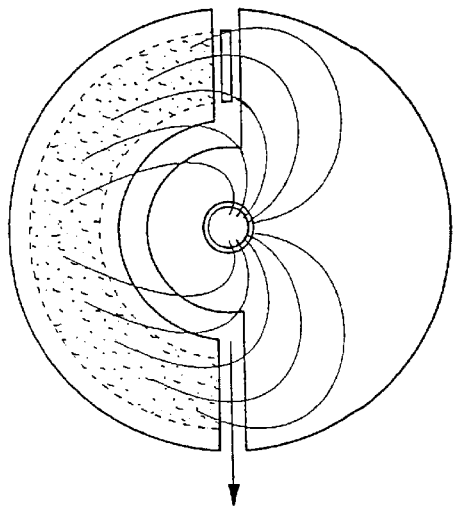
Figure 9:
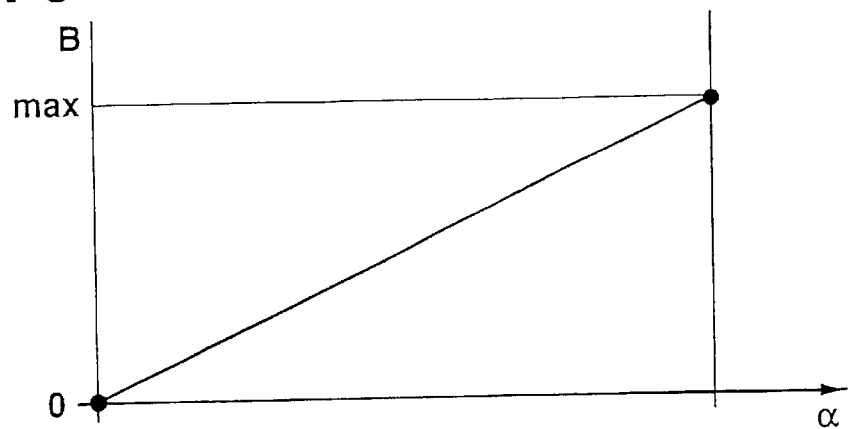
FIG. 9 shows the corresponding curve of the induction B over the angle of rotation α.

FIG. 9 shows the course of the characteristic curve of the magnetic induction B in the element 25, e.g. a Hall element, over the angle of rotation α of the axle 11. It is clear that with an angle of rotation α of 0°, the induction B is likewise zero, while with the maximal angle of rotation α, the maximal induction value is also achieved. In this exemplary embodiment, the maximal angle of rotation is reached at 180°. The position of the sensor 10 with an angle of rotation of 0° is shown in FIGS. 5 and 6. It is clear that the magnetic flux travels from the permanent magnet 15 via the small gap 20, which allows the rotor to move in relation to the stator, to the segment 16, from there via the small support gap, to the projection 12, and from there, via the supporting plate 14, back to the permanent magnet 15. As can be seen in particular in FIG. 6, the magnetic flux is controlled so that with an angle of rotation of 0°, it does not travel through the element 25 so that no magnetic induction B can occur in the element 25. If the axle 11 and hence the supporting plate 14 with the permanent magnet 15 are now rotated, then the magnetic flux traveling through the element 25 is increased and the linear measurement line shown in FIG. 9 is produced. FIGS. 7 and 8 show the setting with the maximal angle of rotation α. FIG. 7 is a view of FIG. 8 in the direction A. In the position of the maximal angle of rotation α, all of the magnetic flux of the permanent magnet 15 travels via the small gap into the segment 17. From there, the magnetic flux flows through the one gap 21, into the segment 16 and a on the opposite side, via the other gap 21, back through the support gap, into the projection 12, and from there, via the supporting plate 14, to the permanent magnet 15. It is clear, particularly from FIG. 8, that when passing through the gap 21, nearly all of the magnetic flux is conveyed through the element 25 and as a result, a maximal possible magnetic induction B is produced in the element 25. It is also clear from FIG. 8 that the spacing gap 22 causes nearly all of the magnetic lines to travel via the gap 21 and consequently through the element 25. As close as possible to none of the magnetic flux is permitted to travel via the spacing gap 22.

Figure 10:
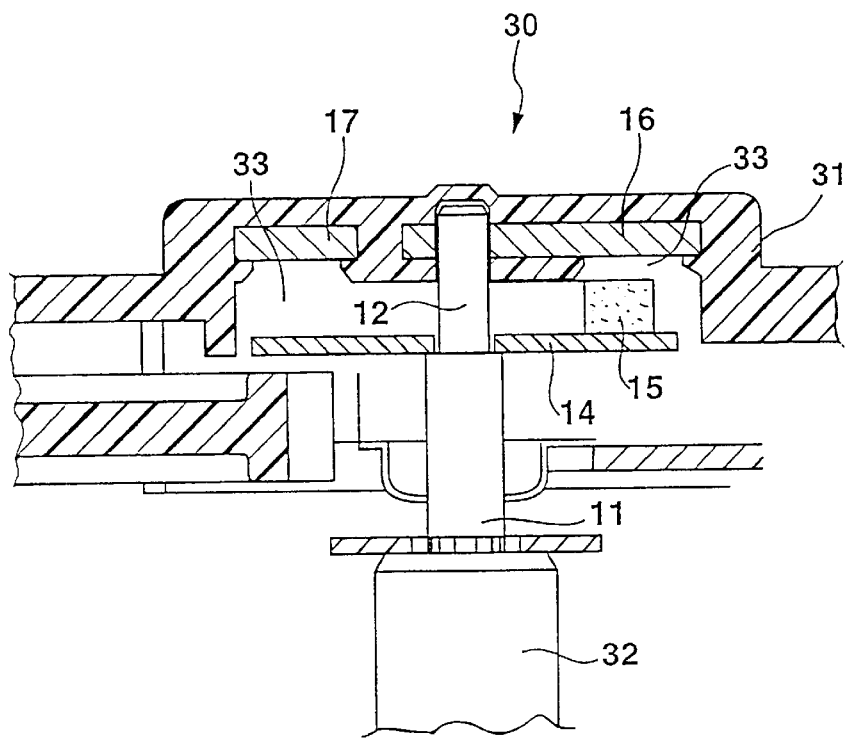
FIGS. 10 and 11 show longitudinal sections through other exemplary embodiments, which represent the installation of the sensor in a throttle valve adjuster and a pedal travel sensor.
Figure 11:
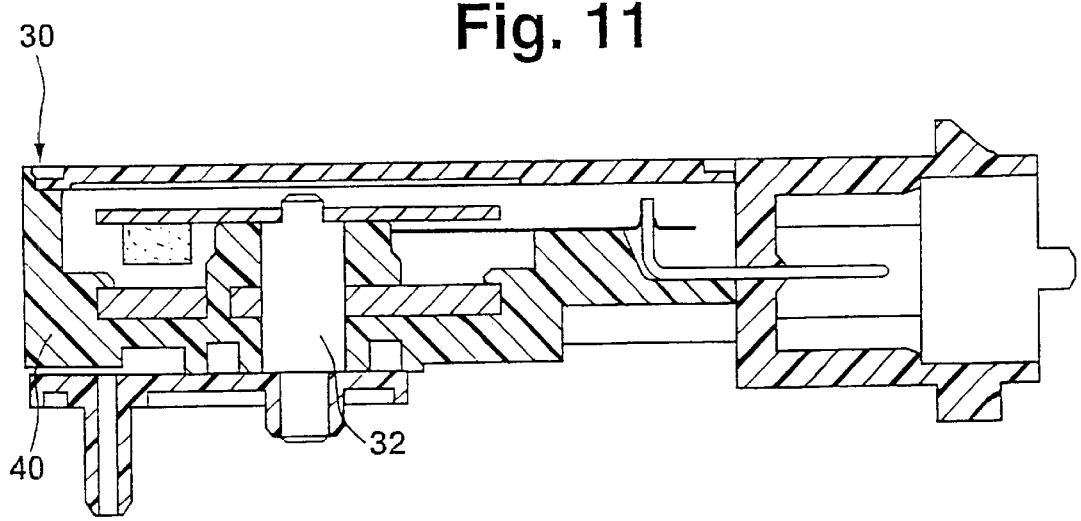

The exemplary embodiment according to FIG. 10 shows the installation of the above-described sensor in a throttle valve adjusting unit 30. This unit 30 assists in detecting the angle of rotation of a throttle valve for a motor control. In this case, the segments 16, 17 of the stator are disposed directly in the cover 31 of the throttle valve adjusting unit 30. Since the cover 31 is made of plastic, the segments 16, 17 can be injection molded into the cover. However, it would also be possible to clip the two segments 16, 17 of the stator into the cover 31. Naturally, however, there must be a gap 33 which permits a magnetic flux from the permanent magnet 15 to the segments 16 and 17. The one or the two elements 25 are in turn disposed in a gap 33, which is not visible in FIG. 10. The axle 11 here is directly connected to the shaft 32 of the throttle valve or represents a projection of this shaft 32. The supporting plate 14, which has the permanent magnet 15 and serves as a rotor, is consequently connected directly to the shaft 32 of the throttle valve. Without significant changes, the sensor according to FIGS. 1 to 4 and 12 to 15 can be installed in a throttle valve adjusting unit 30. In this case, the for example previously used potentiometer can be simply replaced. FIG. 11 shows a pedal travel sensor. In FIG. 11, the segments 16, 17 of the stator are disposed in the bottom 40 of the unit 30. Here, too, the segments 16, 17 can once more be cast or clipped into the bottom 40. The projection of the shaft 32 consequently protrudes through the stator, and the supporting plate 14 serving as the rotor is connected to the end of the axle 32. Consequently, according to FIGS. 10 and 11, the sensor according to the embodiments of FIGS. 1 to 4 and 12 to 15 can be adapted to the structural circumstances of the throttle valve adjusting unit 30 or the pedal travel sensor.

Figure 12:
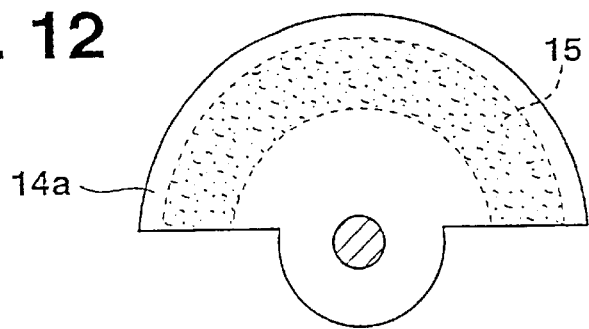
FIGS. 12 and 14 show top views of other exemplary embodiments.
Figure 13:
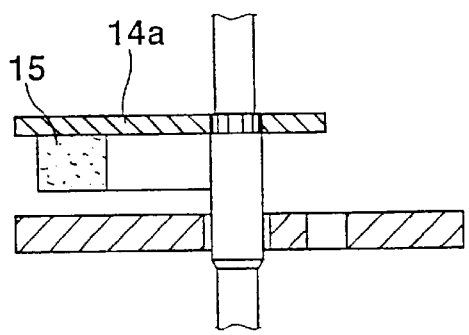
FIGS. 13 and 15 show longitudinal sections through these other exemplary embodiments.
Figure 14:
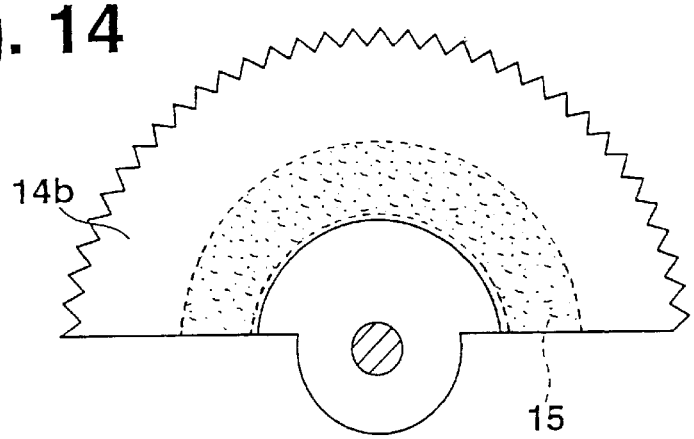
Figure 15:
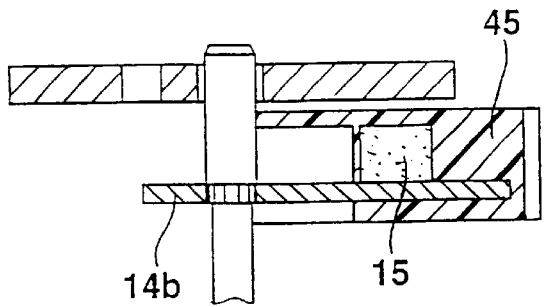
Figure 16:
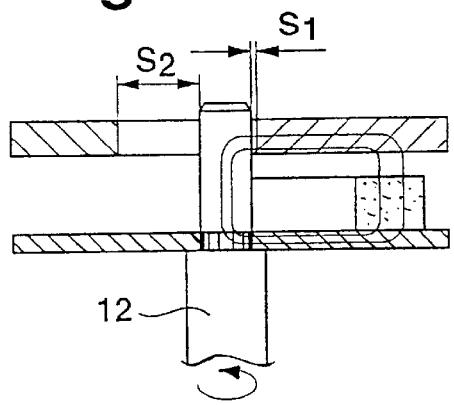
FIGS. 16 to 27 show an exemplary embodiment in which the offset can be shifted by means of a constructive embodiment.
Figure 18:
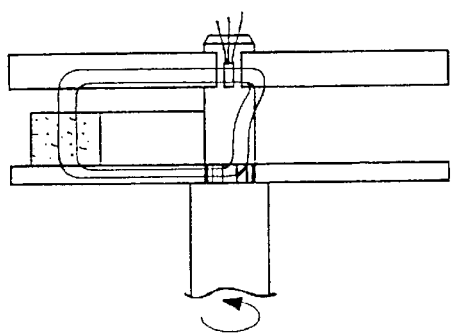
Figure 17:
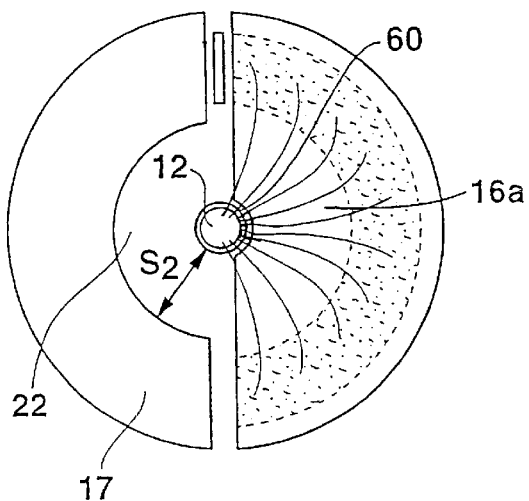
Figure 19:
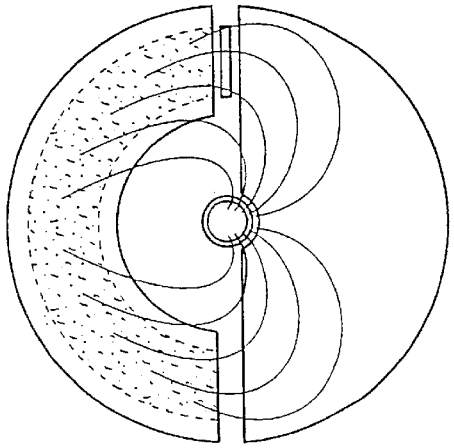

In the exemplary embodiment according to FIGS. 12 and 13, the supporting plate of the sensor is no longer a complete disk. It is sufficient if the supporting plate 14a is embodied as a segment which has an angular range that corresponds to the size of the permanent magnet 15. In relation to FIGS. 1 to 4, FIG. 12 shows a permanent magnet with an angular range of 180°. Consequently, the supporting plate 14a also has an angular range of approximately 180°. The outer contour of this supporting disk 14a embodied as a segment can be arbitrarily embodied. Thus, for example in FIGS. 14 and 15, the supporting segment 14b is embodied as a gear segment. As is clear, particularly from FIG. 15, the gear segment 45 is injection molded onto the supporting disk 14b, wherein the gear segment 45 also encompasses the permanent magnet 15 along with this. With the aid of the gear segment, which is made of a magnetically nonconductive material, a driving force can be simultaneously introduced onto the supporting plate. This permits an integration into a drive mechanism and consequently a very compact construction.

In FIGS. 16 to 27, an exemplary embodiment is described for shifting the characteristic curve at the offset point. In other devices according to prior art, this shift is produced with the aid of an electronic switching device which is, however, complex and expensive. The design of the measuring instrument largely corresponds to the examples described above. The variations shown in FIGS. 10 to 15 can also be adapted in this regard by means of logical changes. Whereas in these examples, the projection 19 encompasses the axle 12 and the magnetic flux from the segment 17 to the segment 16 is thus controlled, the segment 16a in FIG. 17 now has a gap 60 which runs in a circle in the vicinity of the axle and consequently represents a cutout from the segment 16a. This gap 60 can be an air gap or can be filled with another magnetically nonconductive material, as is also the case with the gap 22 described above. As shown in FIG. 11, the segments 17 and 16a are or can be fixed in the cover of the sensor.

Figure 20:
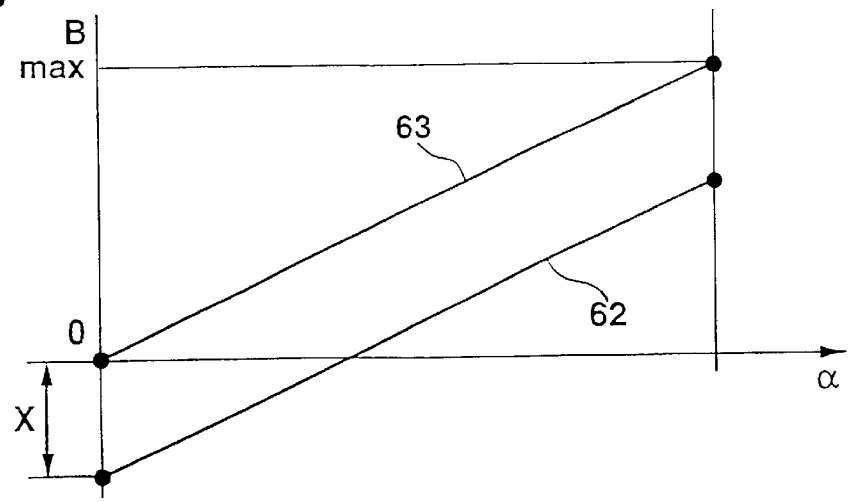
Figure 21:
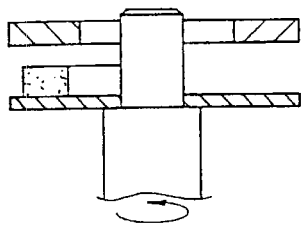
Figure 23:
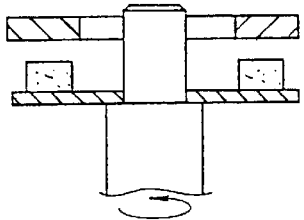
Figure 25:
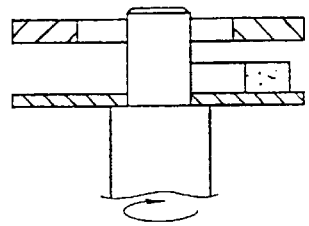
Figure 22:
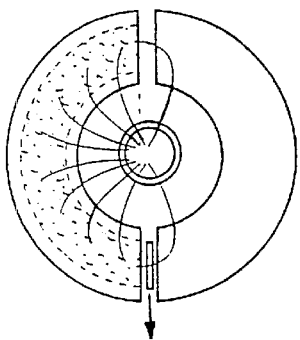
Figure 24:
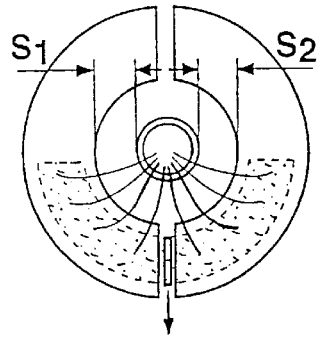
Figure 26:
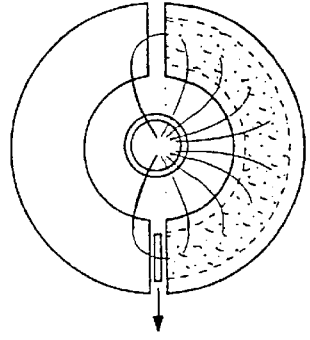
Figure 27:
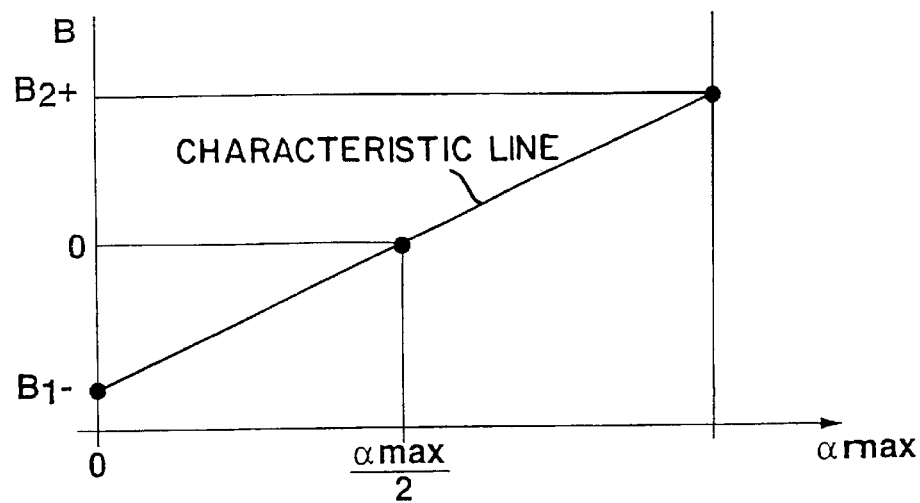

The ratio of the two gaps 22 and 60 to each other is responsible for the shifting of the characteristic curve at the offset. FIG. 20 now shows the course of the characteristic curve 62 of the magnetic induction B in the element 25, for example a Hall element, over the angle of rotation α of the axle 11. The characteristic curve 63 is shown for comparison with the embodiment without the gap 60 according to the exemplary embodiments according to FIGS. 1 to 7. In an embodiment according to FIGS. 1 to 15, it would represent the course of the induction B over the angle of rotation α. In the depiction in FIGS. 16 and 17, with an angle of rotation α of zero degrees, the gap 60 yields a negative value for the induction B, whereas with the maximal angle of rotation, the maximal induction value $B_{max}$ is also achieved. It is clear from FIG. 20 that the two characteristic curves 62 and 63 extend parallel to each other. They are only shifted in relation to each other by the offset amount X. By means of the ratio of the two gaps 22 and 60 to each other, the offset X of the characteristic curves 62 and 63 can now be shifted to the desired position. The smaller the gap 60 in relation to the gap 22, the greater. the offset shift of the characteristic curve 62. The characteristic curve 62 can be shifted at the offset by matching the gaps 60 and 22 to each other or by adjusting the ratio of gap 60 to gap 22.

For the sake of clarification, FIGS. 21 to 27 show an exemplary embodiment in which the gap 60 and the gap 22 are the same size and consequently represent a ratio of 1. In the initial position with an angle of rotation a α=0, a maximal negative induction $B_1$ is produced. It is clear from FIG. 22 that in this initial position with an angle of rotation a α=0, the permanent magnet 15 does not overlap with the element 25. By contrast, a maximal angle of rotation $α_{max}$ yields the maximal positive induction $B_2$. As can be inferred from FIG. 26, the permanent magnet does not overlap with the element 25 in this case either. The device is now adjusted so that with an angle of rotation $α_{max}/2$, the induction B is equal to zero. As can be inferred from FIGS. 23 and 24, in this first position, the permanent magnet is disposed centrally over the element 25.

What is claimed is:

1. A measuring instrument for determining a rotational movement of a component, comprising a rotor connectable to the component and provided with a magnet; a stator arranged so that an air gap is provided between said stator and said rotor, said stator being composed of at least two segments which are separated by magnetically non conductive gap means; at least one magnetic field-sensitive element located in at least one gap of said gap means, at least one of said segments of said stator having no magnetically conductive connection to said rotor, said rotor having an axle with at least one region composed of a magnetically conductive material and extending from said rotor to another of said segments of said stator that has a magnetically conductive connection to said rotor; said gap means including at least another first gap provided between said two segments of said stator and formed in a segment of said stator for impeding a magnetic flux of said permanent magnet and controlling the magnetic flux so that it travels via said at least one first gap, said stator having the segment provided with a second gap of said gap means, which is formed so that said first gap and said second gap of said stator at least partially encompass said axle of said rotor.

2. A measuring instrument as defined in claim 1, wherein said first gap is larger than said at least one gap.

3. A measuring instrument as defined in claim 1, wherein said first gap and said second gap encompass said axle of said rotor.

4. A measuring instrument as defined in claim 1, wherein said first gap and said second gap have a ratio of widths selected so that an offset shift of a characteristic curve of the measuring instrument is produced.

5. A measuring instrument as defined in claim 1, wherein said rotor and said stator are disc-shaped.

6. A measuring instrument as defined in claim 1, wherein said rotor is formed as a segment.

7. A measuring instrument as defined in claim 1; and further comprising another such one gap, each of said two one gaps having at least one respective Hall element located in a respective one of said two one gaps.

8. A measuring instrument as defined in claim 1, wherein said axle and said rotor are formed of one piece with one another.

9. A sensor, including a measuring instrument for determining a rotational movement of a component, comprising a rotor connectable to the component and provided with a magnet; a stator arranged so that an air gap is provided between said stator and said rotor, said stator being composed of at least two segments which are separated by magnetically non conductive means gap; at least one magnetic field-sensitive element located in said at least one gap of said gap means, at least one of said segments of said stator having no magnetically conductive connection to said rotor, said rotor having an axle with at least one region composed of a magnetically conductive material and extending from said rotor to another of said segments of said stator that has a magnetically conductive connection to said rotor; said gap means including at least another first gap provided between said two segments of said stator and formed in the segment of said stator for impeding a magnetic flux of said permanent magnet and controlling the magnetic flux so that it travels via said at least one gap, said stator having the segment provided with a second gap of said gap means which is formed so that said first gap and said second gap of said stator at least partially encompass said axle of said rotor; and a cover of the sensor, said stator being formed as a part integrated into said cover, said cover being composed of plastic.

10. A sensor as defined in claim 9, wherein the sensor is formed as a throttle valve sensor.

11. A sensor as defined in claim 9, wherein the sensor is formed as a pedal sensor.

12. A sensor, including a rotor connectable to the component and provided with a magnet; a stator arranged so that an air gap is provided between said stator and said rotor, said stator being composed of at least two segments which are separated by magnetically non conductive gap means; at least one magnetic field-sensitive element located in at least one gap of said gap means, at least one of said segments of said stator having no magnetically conductive connection to said rotor, said rotor having an axle with at least one region composed of a magnetically conductive material and extending from said rotor to another of said segments of said stator that has a magnetically conductive connection to said rotor; said gap means including at least another first gap provided between said two segments of said stator and formed in a segment of said stator for impeding a magnetic flux of said permanent magnet and controlling the magnetic flux so that it travels via said at least one gap, said stator having the segment provided with a second gap of said gap means, which is formed so that said first and said second gap of said stator, at least partially encompass said axle of said rotor; and a bottom of the sensor, said stator being formed as a part integrated in said bottom, said bottom being composed of plastic.

13. A sensor as defined in claim 12, wherein the sensor is formed as a throttle valve sensor.

14. A sensor as defined in claim 12, wherein the sensor is formed as a pedal sensor.

* * * * *